United States Patent [19]
Hennen et al.

[11] 3,772,088
[45] Nov. 13, 1973

[54] CLOSURE ASSEMBLY FOR STORAGE BATTERY

[75] Inventors: Roy Erving Hennen, Maquon; Vincent Michael Halsall, Bayside, both of Wis.

[73] Assignee: Globe-Union Inc., Milwaukee, Wis.

[22] Filed: Mar. 20, 1972

[21] Appl. No.: 236,351

[52] U.S. Cl. .............................. 136/170, 136/177
[51] Int. Cl. ........................................ H01m 1/02
[58] Field of Search .................. 136/170, 177, 178, 136/179

[56] References Cited
UNITED STATES PATENTS

| | | | |
|---|---|---|---|
| 3,666,564 | 5/1972 | Corbin et al. | 136/177 |
| 3,507,708 | 4/1970 | Vignaud | 136/177 |
| 3,360,403 | 12/1967 | Halsall | 136/170 |
| 3,329,531 | 7/1967 | Hennen | 136/170 |
| 3,647,556 | 3/1972 | Cox | 136/177 |

Primary Examiner—Donald L. Walton
Attorney—John Phillip Ryan et al.

[57] ABSTRACT

A closure assembly for a storage battery which can be completely or partially sealed with the battery casing and which has a portion integrally hinged to afford access to the cell vent openings. A manifold system is provided to direct gases from the cells to a common channel and through a porous ceramic diffuser before being vented to the outside of the cover. Baffles and dams are disposed in the channels to block the flow of electrolyte and provide positive retention of electrolyte. The channels are pitched in a manner to cause any escaped electrolyte to flow back into the cells through openings in the channel walls.

10 Claims, 4 Drawing Figures

PATENTED NOV 13 1973　　　3,772,088
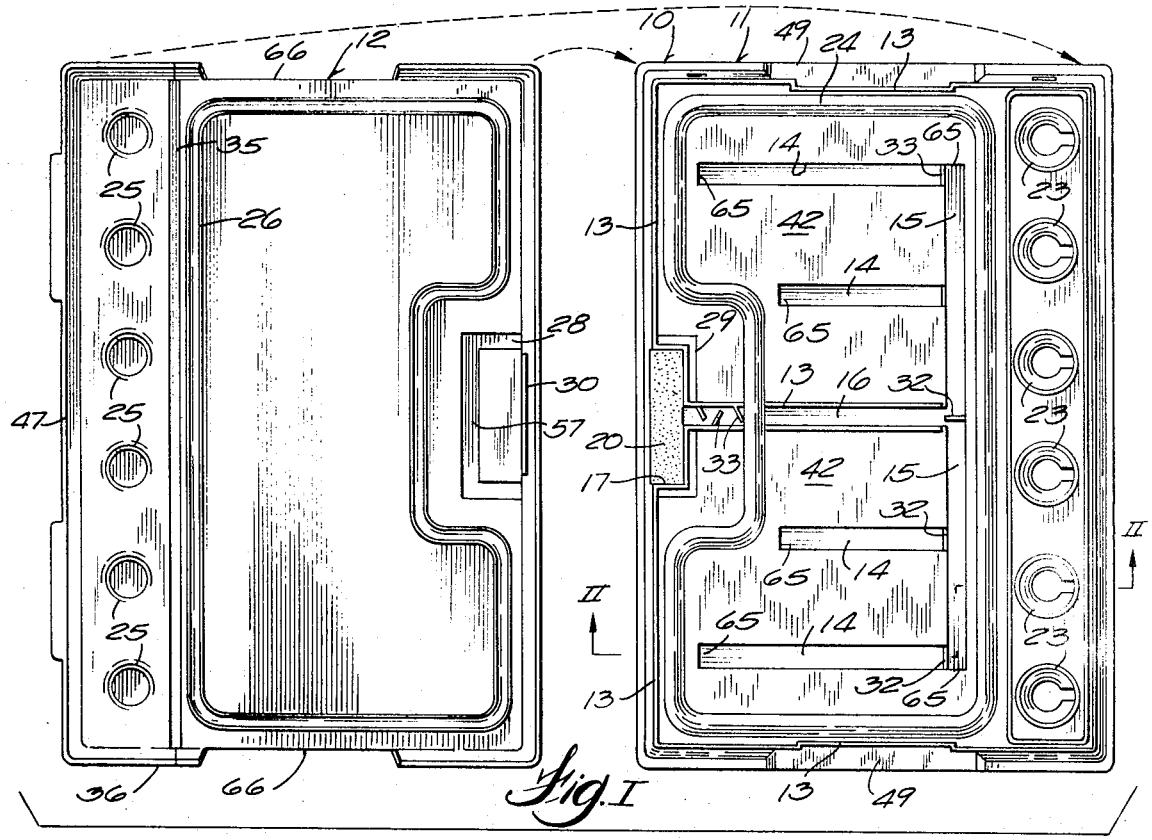
Fig. I
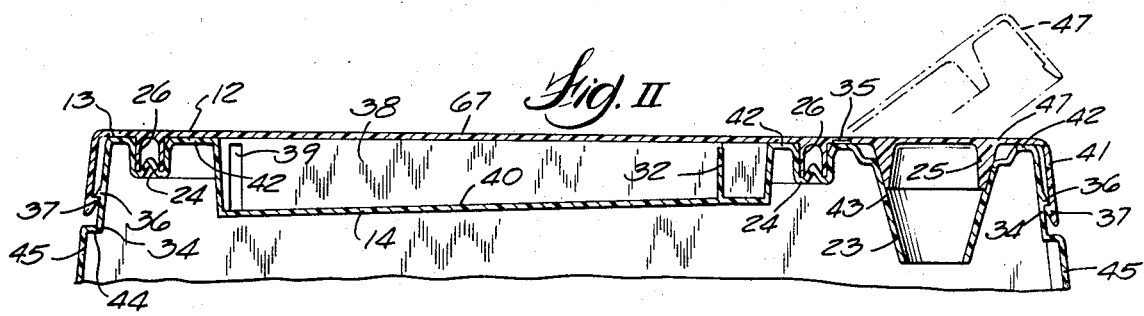
Fig. II
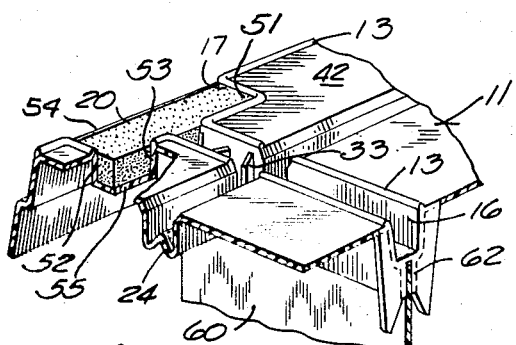
Fig. III
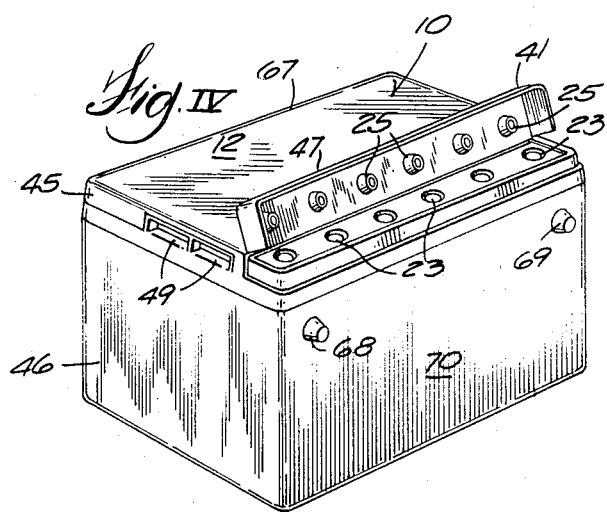
Fig. IV

CLOSURE ASSEMBLY FOR STORAGE BATTERY

BACKGROUND OF THE INVENTION

This invention relates to storage batteries and, more particularly, to an improved closure assembly which can afford certain venting and electrolyte spillproof features as well as limited access to the cell vent openings.

The filling of battery cells with water to provide adequate electrolyte and to prevent accumulation of gases during the charging and discharging of a battery have always been a problem in the storage battery industry. Attempts to provide for quick filling and venting is shown in U.S. Pat. No. 3,369,940 where a gang type vent plug is disclosed with vents disposed between flange-like plugs for the cell vent openings. A multiple type closure is also disclosed in U.S. Pat. No. 3,485,678 for maintaining electrolyte levels and U.S. Pat. No. 2,615,062 illustrates a means to entrap gases and electrolyte acid to return them to the cell. There is currently on the market a cover for a storage battery having a top which completely encloses the battery and provides a vent for any gas accumulation. However, there is not currently available a cover with an enclosing top for a storage battery which provides for maximum diffusion of gases to the atmosphere to reduce explosion hazard while at the same time affording positive retention of electrolyte in those instances where the battery is not maintained on a horizontal plane, with subsequent return of electrolyte to the cells. Neither is there currently available a gang type plug for all the battery cell vent openings wherein all of the vent openings are made readily accessible by the opening of a portion of the top of the cover and still have the members integrally fixed to the top of cover for a battery.

It is an object of the present invention to provide a novel closure assembly for a storage battery which affords maximum venting of gases emitted from the cells. It is another object of this invention to provide a manifold system for a battery cover which includes means to effect retention of the electrolyte. It is still another object of the present invention to provide a top enclosure member for a battery cover which is integrally hinged so as to afford access to the cell vent openings but which can alternatively be sealed to the cover to prevent access and afford maintenance free features. It is yet another object of this invention to provide a closure assembly for storage battery which provides in one assembly unit limited access, venting of gases and retention of electrolyte.

SUMMARY OF THE INVENTION

The foregoing objects are accomplished and the shortcomings of the prior art are overcome by the present closure assembly for a storage battery wherein the intermediate cover includes endwall means with a plurality of interconnecting grooves communicating with the cells by means of openings in the groove walls. A manifold system is provided by the grooves which communicate with a common groove and ultimately lead to a compartment which contains a porous ceramic filter for diffusion of the cell gases. A sealing cover member overrides the grooves so as to form channels and the channels are pitched toward the openings, the channels having dams and baffle members to prevent the electrolyte from spilling outside the battery casing when the battery is positioned within a 30° angle from the horizontal.

BRIEF DESCRIPTION OF DRAWINGS

A better understanding of the present cover assembly will be accomplished by reference to the drawing wherein:

FIG. I is a top plan view showing the two portions of the cover assembly in a side-by-side relationship with the top shown upside down on the left side and the intermediate cover in an upright position on the right-hand side.

FIG. II is a view in vertical section taken along line II—II of FIG. I and showing the intermediate cover enclosed by the top and with a portion of the top illustrated in open position.

FIG. III is a partial perspective view showing the channels, the gas diffuser and the engagement of the cover with the lower cell partitions.

FIG. IV is a perspective view showing the cover section and the top in an assembled position on a side walled terminal battery casing and with a portion of the top in an open position.

DESCRIPTION OF THE PREFERRED EMBODIMENT

Proceeding to a detailed description of the present invention, the closure assembly generally 10 is comprised of an intermediate cover member 11 and a sealing top cover member 12. A plurality of interconnected grooves 14 are disposed in the intermediate cover 11 and are manifolded by means of two laterally extending grooves 15 which interconnect with a common groove 16 and ultimately connect with a compartment 17 disposed in the intermediate cover 11. A porous ceramic diffuser 20 is accommodated by the compartment 17 and is available from any manufacturer of ceramic filters upon specification of particle size, percentage of open volume and basic materials. In this instance the diffuser 20 is manufactured from alumina with a glass binder having a 16–17 percent open volume and a particle size ranging from U.S. standard mesh 45 to 60 which is approximately 0.0139 to 0.0098 inch. A plurality of flange-like openings 23 are linearly disposed in the end wall section 11 adjacent the lateral edge thereof and accommodate sealing plug members 25 in top cover 12 when the top 12 is placed over the intermediate cover 11. To effect a locking seal between intermediate cover 11 and the top 12, a generally rounded rectangular groove 24 is provided in intermediate cover 11 for frictionally accommodating the double walled, projecting flange 26 in groove 24. A generally U-shaped border 28 in top 12 will seat on the corresponding generally U-shaped gasket area 29 in cover 11 when the top 12 is placed over the cover 11. An elongated slot-like vent 30 is provided through the top 12 immediately adjacent compartment 17 and is substantially of the same length as compartment 17.

As shown in FIG. 1, disposed in the interconnected grooves 14 as well as lateral grooves 15 and common groove 16 are a plurality of dam members 32. A series of angled baffles 33 are located in common channel 16 and adjacent compartment 17 and it will be noted that these baffles 33 are angled in a direction away from compartment 17 to encourage drainback of electrolyte to the cells. Both intermediate cover 11 and top cover member 12 are composed of a polypropylene material having a wall thickness in the range of about 0.040–0.090. A lateral hinge 35 is provided in top cover 12 to afford movement of that section containing plugs 25 independently of the section containing the sealing flange 26.

Referring specifically to FIG. II, it will be seen that the cover 11 has a peripheral skirt portion 34 which extends downwardly on all four sides. A projecting rib-like flange 36 is disposed on the skirt portion and is positioned to engage a projecting end portion 37 on the top cover 12 to afford a friction tight engagement of the top 12 over the end wall section 11. Sealing of top 12 to intermediate cover 11 is provided by the double walled projection 26 extending from top 12 and the U-shaped groove 24 in the cover 11 for receiving it. Further sealing is facilitated by providing an additional rib of material such as shown at 13 around the periphery of intermediate cover 11 as well as around compartment 17 and along both sides of channel 16. To assure proper sealing of diffuser 20 between cover 11 and top 12, an indented U-shaped border 57 is provided in top 12 to accommodate that portion of rib 13 extending around the diffuser 20 in cover 11. An elongated slot 39 is provided in the side wall 38 of groove 14 and it will be noted that the bottom or floor surface 40 of channel 14 is pitched in the direction of the slot 39. It will be recognized that while slot 39 affords venting for a cell in the battery, it can also permit electrolyte to flow up into the channel 14. By having the floor 40 pitched in the direction of the slot, electrolyte will flow back through the slot 39 and into the cell when the battery retains a normal vertical position. The top ceiling cover member 12 will engage the uppermost portion of the closed end wall section 11 such as at 42 to afford a sealing engagement with the end wall section and thus, in effect, form trough members from the grooves 14. It will be seen that dams such as at 32 and extending upwardly from floor 40 of a trough 14 terminate a short distance from the top cover member 12 to as to permit the passage of gases over the dam 32 and through the troughs or channels but to block any flow of liquid in the trough 14.

The cells in battery casing 46 are sealed by frustoconical shaped cell openings 23 engaged by plugs 25 having a portion of the walls of the same taper such as shown at 43. It will be recognized that for sealing purposes it is not necessary to have the wall section of openings 23 extend beyond the length of plug 25. Further, skirt 34 is formed in a stepped manner such as at 44 to provide a lower section 45 for engagement with the outside of the battery case 46. This is best shown in FIG. II. As explained earlier, a portion of the top cover 12 is hinged such as at 35 to provide a flip-open section 47 composed in part from skirt 41 and containing plugs 25. Disposed in the skirt portion 34 in intermediate cover 11 are pairs of openings 49 to afford manual gripping of the battery, it being understood that similar openings are provided at the opposite wall of the end wall section.

Turning to FIG. III, it will be seen that compartment 17 is molded into intermediate cover 11 with the compartment having opposite sidewalls 51 and 52, front and rear walls 53 and 54 and a bottom wall 55. The compartment 17 aids in diffusing the gases which are manifolded through the channels and toward the filter 17 to be forced to exit only by means of the slot 30 in the top cover 12 when the top cover 12 is placed over the end wall section 11. Engagement with a cell separator 60 is afforded by a split walled section 62 at the base of the bottom of channel or trough 16. It should be recognized that as the cell separators 60 are all disposed centrally under the trough 16 and those indicated by the numeral 14 that slots in the sidewalls 38 of the troughs 14 and 15 will accommodate each of the cells. To better visualize this and although they are not shown in the top cover portion 12 in FIG. I the position of all of the slots is indicated by the numeral 65. They are located at the lowest or deepest sections of the respective trough members 14 and 15. Concerning trough members 14, they are pitched in a downward manner from dam 32 to the positions of the slots indicated at 65. In the instance of common channel or groove 16, it is pitched away from compartment 17 and toward the bisecting dam 32 with lateral channels 15 pitched away from the bisecting dam. It should be also pointed out that floor 55 of compartment 17 is pitched in a V-like manner and away from sidewalls 51 and 52 toward the uppermost portion of common channel 16.

As was pointed out earlier, top cover 12 encloses intermediate cover 11 in a snug manner. The peripheral skirt 41 is interrupted such as shown by the U-shaped section 66 to accommodate the two gripping portions 49 in skirt 34 of end wall 11. When the top hinged portion 47 is closed, it will be noted that a smooth top 67 is afforded as the positive and negative terminals 68 and 69 extend through the sidewall 70 of battery casing 46.

OPERATION

A better understanding of the advantages of the cover assembly 10 will be had by a description of its operation. Cover section 11 and top cover portion 12 will be molded in the usual manner from a polyolefin material such as polypropylene to form the various channels 14, 15, and 16, dams 32, baffles 33, compartment 17, cell vent openings 23 and slots 39 along with flange 26 and groove 24. Hinge 35 along with cell plugs 25 will be molded into top cover 12. The intermediate cover 11 is placed on a battery casing 46 and the usual forming procedures in charging of the battery take place. The top cover 12 will then be heat sealed to intermediate cover 11 and to casing 46 in the usual manner such as by means of a hot platen or ultrasonically. Subsequently, when the battery is in use, proper venting of the cells is at all times maintained through the interconnecting channels 14, 15, and 16. These channels, which are, in effect, troughs when the top cover 12 is placed thereover, ultimately lead through common channel 16 to compartment 17. Thus, any gases which are created from a charging or discharging condition will have to pass through the porous ceramic diffuser 20 which dissipates the gases by causing them to diffuse and also to be cooled.

In actual tests, the battery when subjected to a high charging rate, and a match held at the outlet 30 immediately adjacent filter 20 failed to produce an explosion. It will also be recognized that under actual service conditions, a battery will be tilted from vertical position. This causes electrolyte to gain access through the slots 39. However, a tortuous path is not only provided for the electrolyte before it might gain access to compartment 17 and ultimately to opening 30 but also dam members 32 provide an intermediate stoppage and once the battery is back in a vertical position, any residual electrolyte will flow by gravity into the cell through the slots 39 in their respective troughs. Access to the cells in battery casing 46 is provided by lifting of the top portion 47. All of the plugs 25 are lifted simultaneously with the upward movement of the hinged portion 47. With the hinged portion in a closed position such as indicated in solid lines in FIG. II, a smooth top is provided for the battery thus giving it an unobstructed top which can be fitted into a narrow compartment in a vehicle.

If it be desired to provide a closure assembly where no access to the cells such as through openings 23 is to be afforded, the normally hinged portion 47 can be heat or adhesively sealed to the lower corresponding section of the end wall in a manner similar to securing the adjacent faces of top 12 and cover 11 such as indicated by the numeral 42. Alternatively, top cover 12 can be sealed to intermediate cover 11 with hinged portion 47 remaining operative by eliminating that portion of projection 26 and groove 24 adjacent hinge 35 and instead substituting a flat wall surface with an additional rib of material such as shown at 13 for heat sealing in that area to top cover 12.

A porous ceramic stone material has been described as the preferred material for composing stone 20. If desired, but not preferred because of being combustible, microporous polyethylene could be used.

An important aspect in providing proper venting of gases through diffuser 20 and outwardly through opening 30 is to provide a small space between the top of diffuser 20 and top cover 12 when it is placed thereover. This prevents any accumulation of gases in the area adjacent the diffuser.

It will thus be seen that through the present invention, there is now provided a top cover assembly for a storage battery which affords a high degree of venting of the cell members and at the same time is relatively spillproof. The cover assembly is easily molded from readily available materials and affords the versatility of a completely closed cover or one which is partially closed and yet affords immediate access to the cells as, for example, for filling with electrolyte. The cover assembly is highly effective for venting purposes as well as retention of the electrolyte without requiring the maintenance of close tolerances during the molding operation.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

We claim:

1. A closure assembly for a storage battery having a case with upstanding walls, partitions and cells containing electrolyte comprising: an intermediate cover for said battery with a peripheral skirt extending from said cover to enclose electrolyte in said cells, a plurality of elongated interconnected grooves, a common groove and a compartment defined by said cover, said interconnected grooves, said common groove and said compartment in communication with each other, a porous filter carried in said compartment, means for inhibiting the flow of electrolyte from said cells toward said filter operatively associated with said grooves, a sealing top member overlying said cover and enclosing said grooves to form channels and an opening in said top adjacent said compartment and said filter for venting any gases in said grooves to the outside of said cover assembly.

2. The closure assembly as defined in claim 1 wherein slots are disposed through the walls of said grooves and said means for inhibiting the flow of electrolyte includes said grooves pitched in the direction toward said slots.

3. The closure assembly as defined in claim 2 wherein at least one of said slots communicates with each said cell.

4. The closure assembly as defined in claim 2 wherein said means for inhibiting the flow of electrolyte further includes dam members disposed in said grooves.

5. The closure assembly as defined in claim 4 wherein said dam members extend substantially to the top of said grooves.

6. The closure assembly as defined in claim 1 wherein said means for inhibiting the flow of electrolyte further includes baffle members in said common groove and adjacent said compartment.

7. The closure assembly as defined in claim 6 wherein said cover and said skirt are formed in one solid piece and said top is formed of a second solid piece with both said pieces being formed from polypropylene.

8. The closure assembly as defined in claim 1 wherein said common groove is joined with said interconnected grooves by means of two laterally extending grooves and said grooves are substantially rectilinear and trough shaped and disposed at right angles to each other.

9. The closure assembly as defined in claim 1 wherein said cover means includes a plurality of cell openings in said cover and said top includes a hinged portion with a plurality of interconnected plug members in the area of said cover which overlies the cell openings when said top is placed over said cover.

10. The closure assembly for a storage battery as defined in claim 1 further including a relatively small space disposed between said filter and said opening.

* * * * *